(12) United States Patent
Nakamura et al.

(10) Patent No.: US 10,313,655 B2
(45) Date of Patent: Jun. 4, 2019

(54) IMAGE CAPTURE DEVICE AND IMAGE CAPTURE METHOD

(71) Applicant: FANUC CORPORATION, Yamanashi (JP)

(72) Inventors: Minoru Nakamura, Yamanashi (JP); Yuuki Takahashi, Yamanashi (JP); Atsushi Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/794,408

(22) Filed: Oct. 26, 2017

(65) Prior Publication Data

US 2018/0131922 A1 May 10, 2018

(30) Foreign Application Priority Data

Nov. 9, 2016 (JP) .................................. 2016-218766

(51) Int. Cl.
| | |
|---|---|
| *G01S 17/00* | (2006.01) |
| *H04N 13/167* | (2018.01) |
| *H04N 13/254* | (2018.01) |
| *G01S 17/36* | (2006.01) |
| *G01S 17/89* | (2006.01) |
| *G01S 7/481* | (2006.01) |

(52) U.S. Cl.
CPC ......... *H04N 13/167* (2018.05); *G01S 7/4816* (2013.01); *G01S 17/00* (2013.01); *G01S 17/36* (2013.01); *G01S 17/89* (2013.01); *H04N 13/254* (2018.05); *H04N 2213/005* (2013.01)

(58) Field of Classification Search
USPC ....................................................... 356/5.01
See application file for complete search history.

(56) References Cited

U.S. PATENT DOCUMENTS

| | | | | |
|---|---|---|---|---|
| 8,224,032 | B2 | 7/2012 | Fuchs et al. | |
| 8,593,507 | B2 * | 11/2013 | Yahav | H04N 5/2226 348/46 |

(Continued)

FOREIGN PATENT DOCUMENTS

| | | |
|---|---|---|
| CN | 102378920 A | 3/2012 |
| CN | 103477186 A | 12/2013 |

(Continued)

OTHER PUBLICATIONS

An Office Action issued by the Japanese Patent Office dated Jan. 30, 2018, which corresponds to Japanese Patent Application No. 2016-218766 and is related to U.S. Appl. No. 15/794,408.

(Continued)

*Primary Examiner* — James R Hulka
(74) *Attorney, Agent, or Firm* — Studebaker & Brackett PC

(57) ABSTRACT

To provide an image capture device capable of doing multiple image captures by using multiple image capture units and capable of measuring a distance between each of the image capture units and a target more correctly. An image capture device according to the present invention is an image capture device with multiple image capture units. The image capture device comprises: one light emission unit for distance measurement that emits a reference beam; and the multiple image capture units that capture images of a reflected beam of the reference beam while having common timing of image capture.

3 Claims, 14 Drawing Sheets

(56) References Cited

U.S. PATENT DOCUMENTS

| | | | |
|---|---|---|---|
| 8,988,508 B2 * | 3/2015 | Yahav | G06F 3/017 |
| | | | 348/47 |
| 8,988,662 B1 | 3/2015 | Haskin et al. | |
| 2008/0273758 A1 | 11/2008 | Fuchs et al. | |
| 2011/0134222 A1 * | 6/2011 | Yahav | H04N 5/2226 |
| | | | 348/46 |
| 2012/0075427 A1 * | 3/2012 | Yahav | G06F 3/017 |
| | | | 348/47 |
| 2015/0355330 A1 | 12/2015 | Oberhammer et al. | |

FOREIGN PATENT DOCUMENTS

| | | | |
|---|---|---|---|
| CN | 105391923 A | 3/2016 |
| JP | 2002344800 A | 11/2002 |
| JP | 2004-239989 A | 8/2004 |
| JP | 2009-516157 A | 4/2009 |
| JP | 2011-530097 A | 12/2011 |
| JP | 2013-174446 A | 9/2013 |
| JP | 2013-544155 A | 12/2013 |
| JP | 2016-502657 A | 1/2016 |
| JP | 2016-058995 A | 4/2016 |

OTHER PUBLICATIONS

An Office Action mailed by the State Intellectual Property Office of the People's Republic of China dated Aug. 3, 2018, which corresponds to Chinese Patent Application No. 201711086084.5 and is related to U.S. Appl. No. 15/794,408.

* cited by examiner

IMAGE CAPTURE DEVICE AND IMAGE CAPTURE METHOD

This application is based on and claims the benefit of priority from Japanese Patent Application No. 2016-218766, filed on 9 Nov. 2016, the content of which is incorporated herein by reference.

BACKGROUND OF THE INVENTION

Field of the Invention

The present invention relates to an image capture device and an image capture method employing the time of flight (TOF) system.

Related Art

A distance measurement device (TOF camera) employing the time of flight (TOF) system of measuring time for an emitted infrared ray to be reflected off a target object and then observed by a camera and acquiring a distance to the object based on the measured time has received attention in recent years as a three-dimensional distance measurement device alternative to a device employing the stereo camera system. Demand for TOF cameras has been growing.

Patent Document 1: Japanese Unexamined Patent Application (Translation of PCT Application), Publication No. 2009-516157

Patent Document 2: Japanese Unexamined Patent Application (Translation of PCT Application), Publication No. 2016-502657

SUMMARY OF THE INVENTION

The following has been known based on the principles of distance measurement using a TOF camera. If multiple TOF cameras are arranged at a short distance from each other or at opposing positions and respective light emission units of the TOF cameras emit reference beams, a reflected beam of a reference beam emitted from one of the TOF cameras may influence an image capture unit of a different one of the TOF cameras. In some cases, this makes it impossible to measure a distance correctly.

For this reason, even if images of divided areas of a wide image capture range are to be captured by using multiple TOF cameras simultaneously, reflected beams resulting from beams from the TOF cameras interact with each other during image captures. This has made it impossible to acquire image data with a high degree of stability covering the wide image capture range.

In order for a device to reliably have trouble detection capability of such a high degree as to be required for functional safety, the device has generally been configured in such a manner that two systems each including an input unit, a logic unit, and an output unit are prepared, and further, each of these systems is made to monitor the other system. More specifically, as shown in FIG. 9, the following technique has been employed in some cases in order for a device 10 to reliably have high trouble detection capability. The device 10 has a system 15A including an input unit 11A, a logic unit 12A, and an output unit 13A, and a system 15B including an input unit 11B, a logic unit 12B, and an output unit 13B. Each of the logic unit 12A and the logic unit 12B is made to monitor the other system. In the device 10, both the system 15A and the system 15B may be distance measurement devices employing the TOF system, and both the two input units 11A and 11B may be TOF cameras. If the two input units 11A and 11B are arranged at a short distance from each other and respective light emission units of the input units 11A and 11B emit reference beams, a reflected beam of the reference beam emitted from one of the TOF cameras adversely influences an image capture unit of the other TOF camera. Hence, even if the device 10 includes multiple TOF cameras for the purpose of reducing the likelihood of failure in image capture due to trouble in a camera or failure in detection of camera malfunction, for example, it has still been impossible to increase a degree of stability of distance measurement.

The following describes influence to be caused by a reflected beam in detail by referring to FIG. 10 in the use of multiple TOF cameras adjacent or close to each other. As shown in FIG. 10, a TOF camera 20A includes a TOF image sensor 21A, a lens 22A, and a light emission unit 25A. A TOF camera 20B includes a TOF image sensor 21B, a lens 22B, and a light emission unit 25B. In this case, a reference beam A1 emitted from the light emission unit 25A of the TOF camera 20A and a reference beam B1 emitted from the light emission unit 25B of the TOF camera 20B are both reflected off a target (in this example, a target 30). A reflected beam A2 of the reference beam A1 is input both to the image sensor 21A of the TOF camera 20A and the image sensor 21B of the TOF camera 20B. Likewise, a reflected beam B2 of the reference beam B1 is input both to the image sensor 21A of the TOF camera 20A and the image sensor 21B of the TOF camera 20B.

In the description given below, the TOF camera 20A and the TOF camera 20B may collectively be called a "TOF camera 20" if distinction therebetween is not required. Likewise, the TOF image sensor 21A and the TOF image sensor 21B may collectively be called a "TOF image sensor 21." Likewise, the lens 22A and the lens 22B may collectively be called a "lens 22." Likewise, the light emission unit 25A and the light emission unit 25B may collectively be called a "light emission unit 25." In the present specification, the "TOP image sensor 21" is also called an "image capture unit 21."

In this case, for example, if the reflected beam B2 of the reference beam B1 emitted from the TOF camera 20B is input to the image capture unit 21A of the TOF camera 20A in addition to the reflected beam A2 of the reference beam A1 emitted from the TOF camera 20A, this input of the reflected beam B2 causes influence to prohibit the TOF camera 20A from measuring a distance from the TOF camera 20A to the target 30 correctly. Likewise, if the reflected beam A2 of the reference beam A1 emitted from the TOF camera 20A is input to the image capture unit 21B of the TOF camera 20B in addition to the reflected beam B2 of the reference beam B1 emitted from the TOF camera 20B, this input of the reflected beam A2 causes influence to prohibit the TOF camera 20B from measuring a distance from the TOF camera 20B to the target 30 correctly.

The following describes reason for the above-described influence in detail by referring to FIG. 11 caused on a distance measured by a TOF camera by a reflected beam of a reference beam emitted from a light emission unit of a TOF camera different from the former TOF camera.

To explain the general principles of distance measurement using a TOF camera, FIG. 11 shows the following on the left side: an emitted beam pulse $1a$, a reflected beam pulse $1b$, and a pulse waveform of an image capture timing signal $1c$ and that of an image capture timing signal $1d$ differing from each other in timing. The image capture timing signal 1c has a phase of zero degree. The image capture timing signal 1d has a phase of 180 degrees.

The emitted beam pulse 1a shows the pulse waveform of a reference beam emitted from the light emission unit 25. The emitted beam pulse 1a has a peak width of $T_0$. The reflected beam pulse 1b shows the pulse waveform of a reflected beam of the reference beam reflected off the target 30 and then input to the image capture unit 21. Timing of input of the reflected beam to the image capture unit 21, specifically, timing of rise of a pulse of the reflected beam pulse 1b is delayed by $T_d$ from timing of rise of a pulse of the emitted beam pulse 1a. The TOF camera 20 multiples this difference in time $T_d$ by the speed of light, and determines a resultant value as a distance twice a distance between the TOF camera 20 and the target 30. The value of $T_d$ is calculated by the following method.

An image capture timing signal to be used includes the image capture timing signal 1c having a phase of zero degree and an image capture timing signal 1d having a phase of 180 degrees. The start edge of a pulse peak of the image capture timing signal 1c coincides with the start edge of a pulse peak of the emitted beam pulse 1a. The image capture timing signal 1c and the image capture timing signal 1d differ in phase by 180 degrees. Thus, the end edge of the pulse peak of the image capture timing signal 1c coincides the start edge of a pulse peak of the image capture timing signal 1d.

Here, Q1 stands for charge accumulated by receipt of the reflected beam pulse 1b during image capture by following the image capture timing signal 1c, whereas Q2 stands for charge accumulated by receipt of the reflected beam pulse 1b during image capture by following the image capture timing signal 1d. In this case, $T_d$ described above is calculated based on a ratio between Q1 and Q2. Charge to be generally accumulated by steady ambient light is excluded from each of the charge Q1 and the charge Q2. In FIG. 11, a waveform for an emitted beam is a wave with rectangular pulses. However, not only waveforms with rectangular pulses but also waveforms with sinusoidal waves are actually employed in the use of known TOF cameras. In terms of image capture timing, for the purpose of increasing accuracy or increasing a measured distance, there have also been known TOF cameras timed to capture images by following a phase of 90 degrees and a phase of 270 degrees in addition to a phase of zero degree and a phase of 180 degrees.

As described above by referring to FIG. 10, if two TOF cameras are arranged at a short distance from each other, a reflected beam of a reference beam emitted from one of the TOF cameras may influence an image capture unit of the other TOF camera. In this case, an emitted beam pulse 2a, a reflected beam pulse 2b, and an image capture timing signals 2c and 2d are shown on the right side of FIG. 11 are determined. Like in the explanation of the general principles of distance measurement, the peak width of a pulse of the emitted beam pulse 2a is indicated by $T_0$, and delay of the reflected beam pulse 2b from the emitted beam pulse 2a is indicated by $T_d$.

If two TOF cameras 20 are arranged at a short distance from each other and the light emission units 25A and 25B of the TOF cameras 20 are not synchronized, the reflected beam pulse 2b may contain not only a reflected beam of a reference beam emitted from the light emission unit 25 of one of the cameras but also a reflected beam of an emitted beam pulse emitted from the light emission unit 25 of the other camera (hatched section). Hence, during measurement of the charge Q1 accumulated by receipt of the reflected beam pulse 2b during image capture by following the image capture timing signal 2c, charge accumulated in a period corresponding to an overlap section between a pulse peak of the image capture timing signal 2c and the hatched section at the reflected beam pulse 2b influences a measured value of the charge Q1. Likewise, during measurement of the charge Q2 accumulated by receipt of the reflected beam pulse 2b during image capture by following the image capture timing signal 2d, charge accumulated in a period corresponding to an overlap section between a pulse peak of the image capture timing signal 2d and the hatched section at the reflected beam pulse 2b influences a measured value of the charge Q2. Specifically, the reflected beam of the reference beam emitted from the light emission unit 25 of the other camera influences the respective measured values of Q1 and Q2 and further influences a ratio in charge between Q1 and Q2. This makes it impossible to determine the value of $T_d$ correctly showing a difference in time of the reflected beam pulse 2b from the emitted beam pulse 2a. This eventually makes it impossible to determine a distance between the TOF camera 20 and the target 30 correctly.

FIG. 12 shows an example of a first specific configuration of a conventional image capture device 500. The image capture device 500 includes a TOF camera 510A and a TOF camera 510B. The TOF cameras 510A and 510B are arranged adjacent or close to each other. The TOF camera 510A includes a control circuit 520A, a TOF image sensor 525A, a lens 530A, and a light emission unit 540A. In the example shown in FIG. 12, the control circuit 520A and the TOF image sensor 525A are incorporated into the same chip. Likewise, the TOF camera 510B includes a control circuit 520B, a TOF image sensor 525B, a lens 530B, and a light emission unit 540B. The control circuit 520B and the TOF image sensor 525B are incorporated into the same chip.

In the description given below, the TOF camera 510A and the TOF camera 510B will collectively be called a "TOF camera 510" if distinction therebetween is not required. Likewise, the control circuit 520A and the control circuit 520B will collectively be called a "control circuit 520." The TOF image sensor 525A and the TOF image sensor 525B will collectively be called a "TOF image sensor 525." The lens 530A and the lens 530B will collectively be called a "lens 530." The light emission unit 540A and the light emission unit 540B will collectively be called a "light emission unit 540."

The control circuit 520 transmits a light emission timing signal to the light emission unit 540. Based on the received light emission timing signal, the light emission unit 540 emits a reference beam. The control circuit 520 transmits an image capture timing signal to the TOF image sensor 525. A reflected beam resulting from reflection of the reference beam off a target passes through the lens 530 and is then input to the TOF image sensor 525. Based on the image capture timing signal, the TOF image sensor 525 captures an image of the reflected beam.

The TOF image sensor 525A receives not only the reflected beam of the reference beam emitted from the light emission unit 540A but also the reflected beam of the reference beam emitted from the light emission unit 540B. Hence, calculation of a difference in time between emission of the reference beam from the light emission unit 540A and the input of the reflected beam to the TOF image sensor 525A is adversely influenced by the reflected beam of the reference beam emitted from the light emission unit 540B, as described above. Likewise, the TOF image sensor 525B receives not only the reflected beam of the reference beam emitted from the light emission unit 540B but also the reflected beam of the reference beam emitted from the light emission unit 540A. Hence, calculation of a difference in time between emission of the reference beam from the light emission unit 540B and the input of the reflected beam to the TOF image sensor 525B is adversely influenced by the reflected beam of the reference beam emitted from the light emission unit 540A, as described above.

FIG. 13 shows an example of a second specific configuration of a conventional image capture device 550. The image capture device 550 includes a TOF camera 560A and a TOF camera 560B. The TOF cameras 560A and 560B are arranged adjacent or close to each other. The TOF camera 560A includes a sensor control circuit 570A, a TOF image sensor 575A, a lens 580A, and a light emission unit 590A. In the example shown in FIG. 13, the sensor control circuit 570A and the TOF image sensor 575A are incorporated into different chips. Likewise, the TOF camera 560B includes a sensor control circuit 570B, a TOF image sensor 575B, a lens 580B, and a light emission unit 590B. The sensor control circuit 570B and the TOF image sensor 575B are incorporated into different chips.

In the description given below, the TOF camera 560A and the TOF camera 560B will collectively be called a "TOF camera 560" if distinction therebetween is not required. Likewise, the sensor control circuit 570A and the sensor control circuit 570B will collectively be called a "sensor control circuit 570." The TOF image sensor 575A and the TOF image sensor 575B will collectively be called a "TOF image sensor 575." The lens 580A and the lens 580B will collectively be called a "lens 580." The light emission unit 590A and the light emission unit 590B will collectively be called a "light emission unit 590."

The sensor control circuit 570 transmits a light emission timing signal to the light emission unit 590. Based on the received light emission timing signal, the light emission unit 590 emits a reference beam. The sensor control circuit 570 transmits an image capture timing signal to the TOF image sensor 575. A reflected beam resulting from reflection of the reference beam off a target passes through the lens 580 and is then input to the TOF image sensor 575. Based on the image capture timing signal, the TOF image sensor 575 captures an image of the reflected beam.

The TOF image sensor 575A receives not only the reflected beam of the reference beam emitted from the light emission unit 590A but also the reflected beam of the reference beam emitted from the light emission unit 590B. Hence, calculation of a difference in time between emission of the reference beam from the light emission unit 590A and the input of the reflected beam to the TOF image sensor 575A is adversely influenced by the reflected beam of the reference beam emitted from the light emission unit 590B, as described above. Likewise, the TOF image sensor 575B receives not only the reflected beam of the reference beam emitted from the light emission unit 590B but also the reflected beam of the reference beam emitted from the light emission unit 590A. Hence, calculation of a difference in time between emission of the reference beam from the light emission unit 590B and the input of the reflected beam to the TOF image sensor 575B is adversely influenced by the reflected beam of the reference beam emitted from the light emission unit 590A, as described above.

In a TOF camera, the above-described light emission time $T_0$ is generally from ten to several tens of nanoseconds, so that one light emission produces a small amount of exposure. Thus, light emission and image capture are conducted thousands of times to several tens of thousands of times. According to a technique conventionally known for determining a distance between a TOF camera and a target more correctly in the use of multiple TOF cameras, a frequency of emission of a reference beam is changed between the TOF cameras or emission intervals are changed by using random numbers. Using this technique has reduced influence caused by interference by reflection of a reference beam emitted from a different camera. However, this technique has not ensured that this influence is always kept small.

According to a different technique conventionally known, all TOF cameras are connected to a cable, for example, and means to synchronize all the TOF cameras is provided. Further, as shown in FIG. 14, an interval between frames is divided between the cameras in terms of timing of light emission and timing of image capture. If this technique is used, however, the interval between the frames has adversely been increased by increase in the number of TOF cameras. Still adversely, synchronism between multiple TOF cameras is deteriorated in terms of image capture timing.

In this regard, patent document 1 discloses a device for protecting a dangerous region in an automatic operation facility by monitoring a spatial region. In this device, one illumination device is shared between two image recording units. According to the invention disclosed by patent document 1, however, a second image recording unit is merely for triangulation and is not to be used for measuring a distance between a TOF camera and a target by using the TOF camera.

According to a technique disclosed by Patent document 2, multiple TOF cameras include light sources, and each of the TOF cameras changes its recording mode in response to a degree of detection of a modulated beam coming from a different one of the TOF cameras. However, if the TOF camera changes its recording mode so as to suspend image recording operation or measuring operation, implementation of image capture itself has been stopped or a defective section has been caused in a video stream by the suspension of the image recording operation in some cases. As already described above, this technique has not ensured that influence caused by interference by reflection of a reference beam is always kept small if the TOF camera changes its recording mode so as to change the frequency of a reference beam.

The present invention is intended to provide an image capture device capable of doing multiple image captures by using multiple image capture units and capable of measuring a distance between each of the image capture units and a target more correctly.

(1) An image capture device according to the present invention is an image capture device (image capture device 100, 150, 170, 180 described later, for example) with multiple image capture units (TOF image sensors 103, 153, 175, 184 described later, for example). The image capture device comprises: one light emission unit (light emission unit 107, 157, 177, 186 described later, for example) for distance measurement that emits a reference beam; and the multiple image capture units that capture images of a reflected beam of the reference beam while having common timing of image capture.

(2) In the image capture device described in (1), the multiple image capture units may include a first image capture unit (TOF image sensor 103A, 175A described later, for example) as a master and a second image capture unit (TOF image sensor 103B, 175B described later, for example) as a slave, a control unit (control circuit 101A, 171A described later, for example) for the first image capture unit may output a light emission timing signal to the light emission unit (light emission unit 107, 177 described later, for example) and output an image capture timing signal to a control unit (control circuit 101B, 171B described later, for example) for the second image capture unit, the light emission unit may emit a beam based on the light emission timing signal input from the control unit for the first image capture unit, and the second image capture unit may capture an image based on the image capture timing signal input from the control unit for the first image capture unit.

(3) The image capture device described in (1) may further comprise a sensor control unit (sensor control circuit 151, 181 described later, for example) that outputs a light emission timing signal and an image capture timing signal. The light emission unit (light emission unit 157, 186 described later, for example) may emit the reference beam based on the light emission timing signal input from the sensor control unit, and each of the multiple image capture units (TOF image sensors 153, 184 described later, for example) may capture an image based on the image capture timing signal input from the sensor control unit.

(4) In the image capture device described in (2) or (3), an output unit or an input unit that outputs or inputs the light emission timing signal and/or the image capture timing signal may comprise delay control means (phase shifter 174, 183 described later, for example).

(5) An image capture method according to the present invention is an image capture method implemented by an image capture device with multiple image capture units (TOF image sensors 103, 153, 175, 184 described later, for example). The method comprises: making one light emission unit (light emission unit 107, 157, 177, 186 described later, for example) for distance measurement emit a reference beam; and making the multiple image capture units capture images of a reflected beam of the reference beam, the multiple image capture units having common timing of image capture.

According to the present invention, multiple image captures can be performed by using multiple image capture units, and a distance between each of the image capture units and a target can be measured more correctly.

DETAILED DESCRIPTION OF THE INVENTION

Embodiments of the present invention will be described in detail by referring to FIGS. 1 to 8.

First Embodiment

Figure 1:
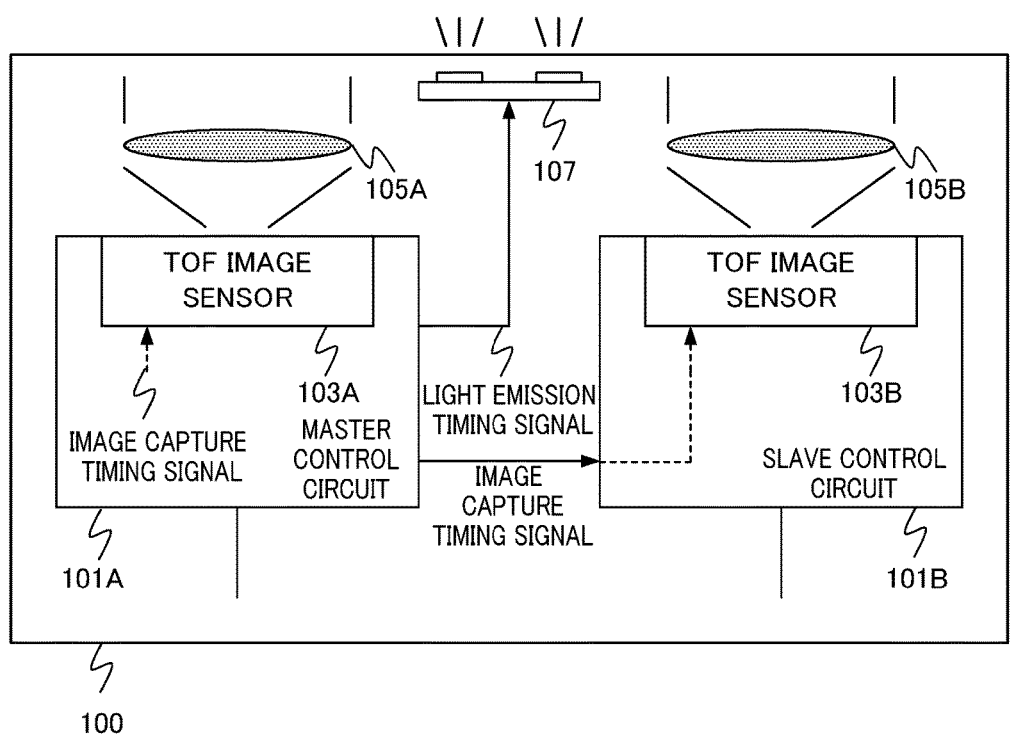
FIG. 1 shows the configuration of an image capture device according to a first embodiment of the present invention.

As shown in FIG. 1, an image capture device 100 according to a first embodiment of the present invention includes a master control circuit 101A, a slave control circuit 101B, a TOF image sensor 103A to be controlled by the control circuit 101A, and a TOF image sensor 103B to be controlled by the control circuit 101B. (In the present specification, the "TOF image sensor 103A" may also be called an "image capture unit 103A." Likewise, the "TOF image sensor 103B" may also be called an "image capture unit 103B.") The image capture device 100 further includes a lens 105A corresponding to the TOF image sensor 103A, a lens 105B corresponding to the TOF image sensor 103B, and a light emission unit 107.

The master control circuit 101A transmits a light emission timing signal to the light emission unit 107. Based on the received light emission timing signal, the light emission unit 107 emits a reference beam. The master control circuit 101A transmits an image capture timing signal to the TOF image sensor 103A and to the slave control circuit 101B. The slave control circuit 101B transmits the image capture timing signal received from the master control circuit 101A to the TOF image sensor 103B. A reflected beam resulting from reflection of the reference beam emitted from the light emission unit 107 off a target passes through the lens 105A and is then input to the TOF image sensor 103A. The TOF image sensor 103A captures an image of the reflected beam based on the above-described image capture timing signal. At the same time, the reflected beam resulting from reflection of the reference beam emitted from the light emission unit 107 off the target passes through the lens 105B and is then input to the TOF image sensor 103B. The TOF image sensor 103B captures an image of the reflected beam based on the above-described image capture timing signal. Specifically, the TOF image sensor 103A and the TOF image sensor 103B share the reflected beam of the reference beam emitted from the light emission unit 107. Further, the TOF image sensor 103A and the TOF image sensor 103B are timed to capture images in a synchronized manner.

The above-described operation of the image capture device 100 will be described next in detail by referring to the flowchart of FIG. 2.

In step S11, the master control circuit 101A transmits a light emission timing signal to the light emission unit 107. Further, the master control circuit 101A transmits an image capture timing signal having a phase of zero degree to the TOF image sensor 103A under control by the master control circuit 101A and to the slave control circuit 101B. The transmission of the light emission timing signal and the transmissions of the image capture timing signal are performed simultaneously.

In step S12, the slave control circuit 101B transmits the image capture timing signal having a phase of zero degree received from the master control circuit 101A to the TOF image sensor 103B under control by the slave control circuit 101B.

In step S13, the light emission unit 107 emits a reference beam based on the light emission timing signal received from the master control circuit 101A. At the same time, each of the TOF image sensors 103A and 103B captures an image of a reflected beam resulting from reflection of the reference beam off a target based on the above-described image capture timing signal having a phase of zero degree. While not shown explicitly in the flowchart of FIG. 2, in many cases, steps S11 to S13 are executed continuously and repeatedly a predetermined number of times (generally, thousands of times).

In step S14, each of the master control circuit 101A and the slave control circuit 101B acquires the value of the above-described charge Q1 from a corresponding one of the TOF image sensors 103A and 103B having captured the images by following the image capture timing of a phase of zero degree. In many general TOF cameras, for the very low intensity of a reflected beam, the charge Q1 and the charge Q2 to produce a sufficient difference for determining a ratio therebetween cannot be obtained by one image capture. Hence, a high degree of accuracy of distance measurement cannot be maintained by one image capture. In this regard, in many cases, steps S11 to S13 are executed continuously and repeatedly a predetermined number of times as described above to accumulate much charge, and then, each control circuit acquires Q1 in step S14.

In step S15, the master control circuit 101A transmits a light emission timing signal to the light emission unit 107. Further, the master control circuit 101A transmits an image capture timing signal having a phase of 180 degrees to the TOF image sensor 103A under control by the master control circuit 101A and to the slave control circuit 101B. The transmissions of this image capture timing signal are performed simultaneously.

In step S16, the slave control circuit 101B transmits the image capture timing signal having a phase of 180 degrees received from the master control circuit 101A to the TOF image sensor 103B under control by the slave control circuit 101B.

In step S17, the light emission unit 107 emits a reference beam and then finishes emission. At the same time, each of the TOF image sensors 103A and 103B captures an image of a reflected beam resulting from reflection of the reference beam off the target based on the above-described image capture timing signal having a phase of 180 degrees. While not shown explicitly in the flowchart of FIG. 2, in many cases, steps S15 to S17 are executed continuously and repeatedly the same predetermined number of times as the number of times steps S11 to S13 are executed.

In step S18, each of the master control circuit 101A and the slave control circuit 101B acquires the value of the above-described charge Q2 from a corresponding one of the TOF image sensors 103A and 103B having captured the images by following the image capture timing of a phase of 180 degrees. Like steps S11 to S13, in many cases, steps S15 to S17 are executed continuously and repeatedly a predetermined number of times to accumulate much charge, and then, each control circuit acquires Q2 in step S18.

In step S19, based on differences in time between the light emission and the receipt of the reflected beam obtained from the acquired Q1 and Q2, the master control circuit 101A and the slave control circuit 101B calculates a distance between the target and the TOF image sensor 103A and a distance between the target and the TOF image sensor 103B respectively.

[Effect Achieved by First Embodiment]

In the above-described configuration, adjacent image capture units capture images in response to emission of a beam from one light emission unit. Thus, unlike in the conventional case where the image capture units include respective light emission units and influence is caused by reflected beams resulting from beams emitted from these light emission units, such influence is removed. This makes it possible to measure a distance between each of the image capture units and a target more correctly even in the use of the multiple image capture units.

Reducing the number of light emission units can achieve reduction in heat generation at the light emission unit, reduction in size of the image capture device itself, and cost reduction.

Figure 3A:
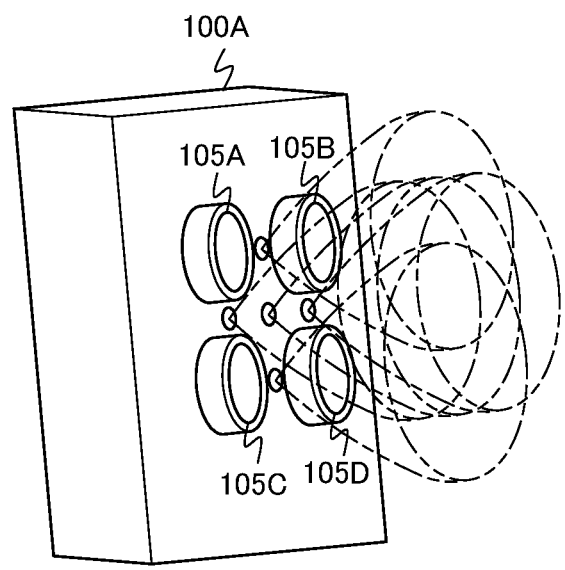
FIG. 3A shows effect achieved by the image capture device according to the first embodiment of the present invention.
Figure 3B:
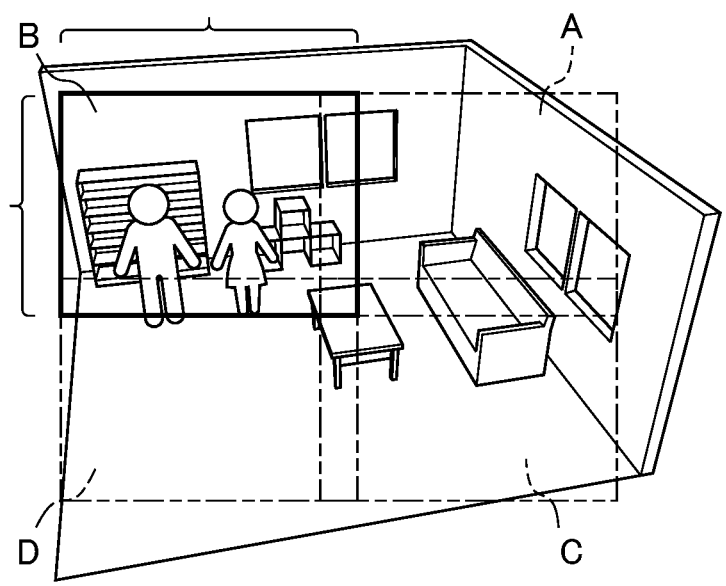
FIG. 3B shows effect achieved by the image capture device according to the first embodiment of the present invention.

Under the present circumstances, even a reflected beam of a very low intensity should still be received with high sensitivity. This makes it difficult to reduce a pixel size, so that attempt for finer scale of an imaging element of an image sensor for TOF image capture has not been made successfully. Thus, to capture an image of a wider image capture range with a high resolution, the image capture range should be divided into areas and images of these areas should be captured by using multiple image capture units, as shown in FIGS. 3A and 3B. More specifically, as shown in FIG. 3A, if an image capture device 100A includes four lenses 105A to 105D, image sensors 103A to 103D (not shown in the drawings) corresponding to the lenses 105A to 105D respectively, and control circuits 101A to 101D (not shown in the drawings) corresponding to the lenses 105A to 105D respectively, the lens 105A and the image sensor 103A work in a pair to capture an image of an area A shown in FIG. 3B. Likewise, the lens 105B and the image sensor 103B work in a pair to capture an image of an area B shown in FIG. 3B. Likewise, the lens 105C and the image sensor 103C work in a pair to capture an image of an area C shown in FIG. 3B. Likewise, the lens 105D and the image sensor 103D work in a pair to capture an image of an area D shown in FIG. 3B. In this way, an area of a wider range can be subjected to image capture than an area to be subjected to image capture by using a lens and an image sensor in a pair. Further, by the presence of the control circuits 101A to 101D, the four pairs each formed of the lens 105 and the image sensor 103 share a reference beam and are timed to capture images in a synchronized manner. Thus, resultant images captured by the four image capture units are free from the influence caused by a reflected beam. As a result, by combining data pieces obtained from the four image capture units, image data with a high resolution about a wider image capture range can be acquired.

Figure 4A:
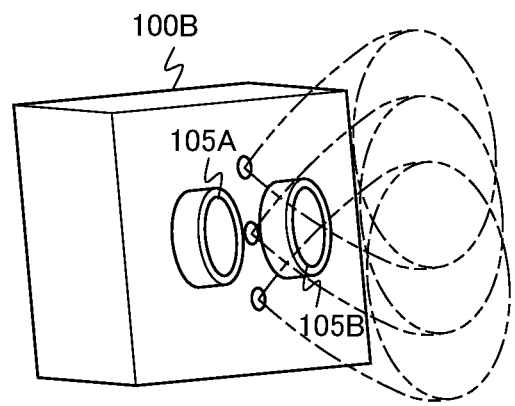
FIG. 4A shows effect achieved by the image capture device according to the first embodiment of the present invention.
Figure 4B:
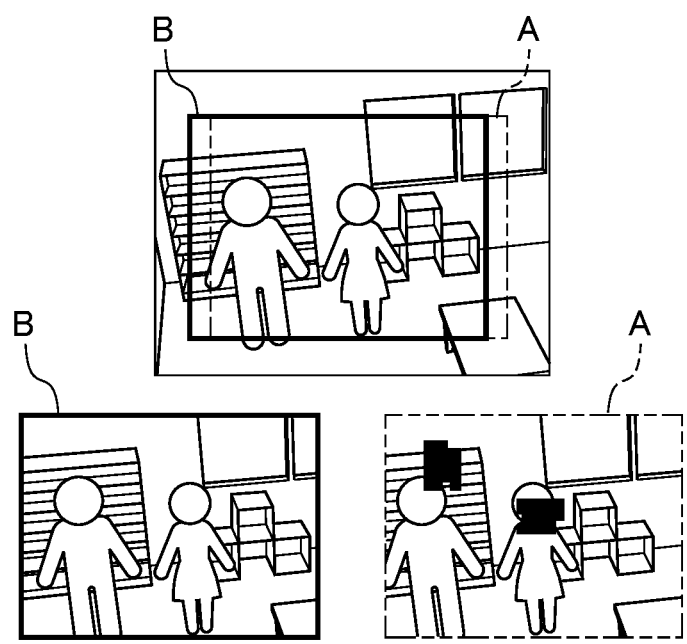
FIG. 4B shows effect achieved by the image capture device according to the first embodiment of the present invention.

Alternatively, as shown in FIGS. 4A and 4B, if images of substantially the same range are captured by using multiple image capture units, image capture can be continued correctly even if one of the image capture units is failed. Further, by comparing data pieces with each other about images captured by using the multiple image capture units, a failure occurring in an image capture unit can be detected. For this reason, this embodiment is applicable to an image capture device not allowed to fail to capture images or an image capture device required to achieve high trouble detection capability. More specifically, as shown in FIG. 4A, if an image capture device 100B includes a lens 105A and a lens 105B, an image sensor 103A and an image sensor 103B (not shown in the drawings) corresponding to the lenses 105A and 105B respectively, and a control circuit 101A and a control circuit 101B (not shown in the drawings) corresponding to the lenses 105A and 105B respectively, the lens 105A and the image sensor 103A work in a pair to capture an image of an area A shown in FIG. 4B. Likewise, the lens 105B and the image sensor 103B work in a pair to capture an image of an area B shown in FIG. 4B. As shown in FIG. 4B, if the image of the area A includes defective pixels, it is detected that any one of the lens 105A, the image sensor 103A, and the control circuit 101A is failed. At the same time, the image of the area A is compensated for by using the image of the area B. In this way, even if the above-described failure in the image capture unit occurs in any of the lens 105A, the image sensor 103A, and the control circuit 101A, failing to capture images can still be prevented.

The system of the present invention is to make multiple image capture units capture images simultaneously. This achieves temporal synchronism between resultant data pieces, so that no consideration is necessary for a difference in image capture timing during combination of the data pieces or mutual comparison between the data pieces.

Second Embodiment

Figure 5:
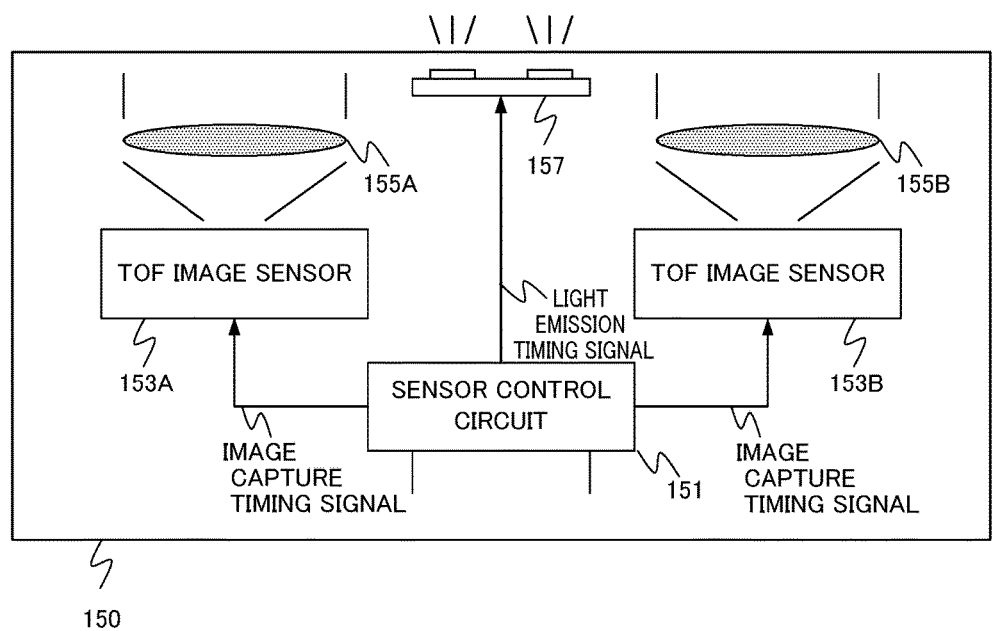
FIG. 5 shows the configuration of an image capture device according to a second embodiment of the present invention.

As shown in FIG. 5, an image capture device 150 according to a second embodiment of the preset invention includes a sensor control circuit 151, and a TOF image sensor 153A and a TOF image sensor 153B to be controlled by the sensor control circuit 151. (In the present specification, the "TOF image sensor 153A" may also be called an "image capture unit 153A." Likewise, the "TOF image sensor 153B" may also be called an "image capture unit 153B.") The image capture device 150 further includes a lens 155A corresponding to the TOF image sensor 153A, a lens 155B corresponding to the TOF image sensor 153B, and a light emission unit 157.

The sensor control circuit 151 transmits a light emission timing signal to the light emission unit 157. Based on the received light emission timing signal, the light emission unit 157 emits a reference beam. The sensor control circuit 151 transmits an image capture timing signal to the TOF image sensor 153A and to the TOF image sensor 153B. A reflected beam resulting from reflection of the reference beam emitted from the light emission unit 157 off a target passes through the lens 155A and is then input to the TOF image sensor 153A. The TOF image sensor 153A captures an image of the reflected beam based on the above-described image capture timing signal. At the same time, the reflected beam resulting from reflection of the reference beam emitted from the light emission unit 157 off the target passes through the lens 155B and is then input to the TOF image sensor 153B. The TOF image sensor 153B captures an image of the reflected beam based on the above-described image capture timing signal. Specifically, the TOF image sensor 153A and the TOF image sensor 153B share the reflected beam of the reference beam emitted from the light emission unit 157. Further, the TOF image sensor 153A and the TOF image sensor 153B are timed to capture images in a synchronized manner.

The above-described operation of the image capture device 150 will be described next in detail by referring to the flowchart of FIG. 6.

In step S21, the sensor control circuit 151 transmits a light emission timing signal to the light emission unit 157. Further, the sensor control circuit 151 transmits an image capture timing signal having a phase of zero degree to each of the multiple TOF image sensors 153A and 153B. The transmission of the light emission timing signal and the transmissions of the image capture timing signal are performed simultaneously.

In step S22, the light emission unit 157 emits a reference beam based on the light emission timing signal. At the same time, each of the TOF image sensors 153A and 153B captures an image of a reflected beam resulting from reflection of the reference beam off a target based on the above-described image capture timing signal having a phase of zero degree. While not shown explicitly in the flowchart of FIG. 6, in many cases, steps S21 and S22 are executed continuously and repeatedly a predetermined number of times (generally, thousands of times).

In step S23, the sensor control circuit 151 acquires the value of the above-described charge Q1 from each of the TOF image sensors 153A and 153B having captured the images by following the image capture timing of a phase of zero degree. In many general TOF cameras, for the very low intensity of a reflected beam, the charge Q1 and the charge Q2 to produce a sufficient difference for determining a ratio therebetween cannot be obtained by one image capture. Hence, a high degree of accuracy of distance measurement cannot be maintained by one image capture. In this regard, in many cases, steps S21 and S22 are executed continuously and repeatedly a predetermined number of times as described above to accumulate much charge. Then, the sensor control circuit 151 acquires Q1 in step S23.

In step S24, the sensor control circuit 151 transmits a light emission timing signal to the light emission unit 157. Further, the sensor control circuit 151 transmits an image capture timing signal having a phase of 180 degrees to each of the multiple TOF image sensors 153A and 153B. The transmissions of this image capture timing signal are performed simultaneously.

In step S25, the light emission unit 157 emits a reference beam and then finishes emission. At the same time, each of the TOF image sensors 153A and 153B captures an image of a reflected beam resulting from reflection of a reference beam off the target based on the above-described image capture timing signal having a phase of 180 degrees. While not shown explicitly in the flowchart of FIG. 6, in many cases, steps S24 and S25 are executed continuously and repeatedly the same predetermined number of times as the number of times steps S21 and S22 are executed.

In step S26, the sensor control circuit 151 acquires the value of the above-described charge Q2 from each of the TOF image sensors 153A and 153B having captured the images by following the image capture timing of a phase of 180 degrees. Like steps S21 and S22, in many cases, steps S24 and S25 are executed continuously and repeatedly a predetermined number of times to accumulate much charge. Then, the sensor control circuit 151 acquires Q2 in step S26.

In step S27, based on differences in time between the light emission and the receipt of the reflected beam obtained from the acquired Q1 and Q2, the sensor control circuit 151 calculates a distance between the target and the TOF image sensor 153A and a distance between the target and the TOF image sensor 153B.

[Effect Achieved by Second Embodiment]

With the above-described configuration, the second embodiment can obtain effect comparable to that achieved by the first embodiment.

Third Embodiment

Figure 7:
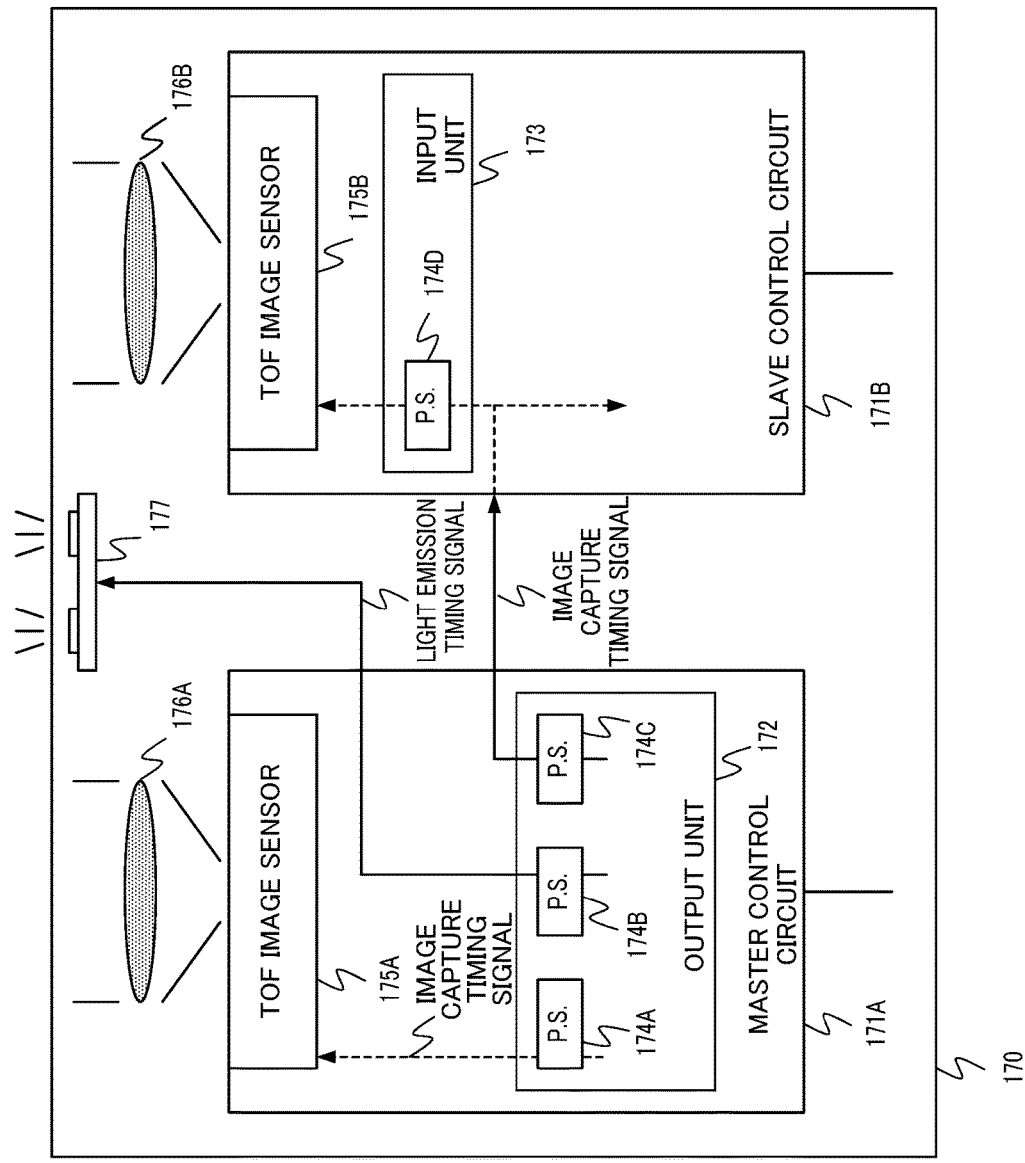
FIG. 7 shows the configuration of an image capture device according to a first modification of the present invention.

FIG. 7 shows a third embodiment. Like the image capture device 100 of the first embodiment, an image capture device 170 according to the third embodiment includes a master control circuit 171A, a slave control circuit 171B, a TOF image sensor 175A to be controlled by the master control circuit 171A, and a TOF image sensor 175B to be controlled by the slave control circuit 171B. (In the present specification, the "TOF image sensor 175A" may also be called an "image capture unit 175A." Likewise, the "TOF image sensor 175B" may also be called an "image capture unit 175B.") The image capture device 170 further includes a lens 176A corresponding to the TOF image sensor 175A, a lens 176B corresponding to the TOF image sensor 175B, and a light emission unit 177. These units have basic functions same as those of the corresponding units of the image capture device 100 according to the first embodiment, so that description of these functions will be omitted.

The master control circuit 171A includes an output unit 172 for output of a light emission timing signal and an image capture timing signal. Unlike in the image capture device 100 according to the first embodiment, the output unit 172 includes three phase shifters (PSs) 174A, 174B, and 174C. The phase shifter 174A is means to control delay of an image capture timing signal to be output from the output unit 172 of the master control circuit 171A to the TOF image sensor 175A by adjusting the phase of this image capture timing signal. The phase shifter 174B is means to control delay of a light emission timing signal to be output from the output unit 172 of the master control circuit 171A to the light emission unit 177 by adjusting the phase of this light emission timing signal. The phase shifter 174C is means to control delay of an image capture timing signal to be output from the output unit 172 of the master control circuit 171A to the slave control circuit 171B by adjusting the phase of this image capture timing signal.

The slave control circuit 171B includes an input unit 173 for input of an image capture timing signal. Unlike in the image capture device 100 according to the first embodiment, the input unit 173 includes a phase shifter 174D. The phase shifter 174D is means to control delay of an image capture timing signal input from the master control circuit 171A to the input unit 173 of the slave control circuit 171B by adjusting the phase of this image capture timing signal.

Figure 2:
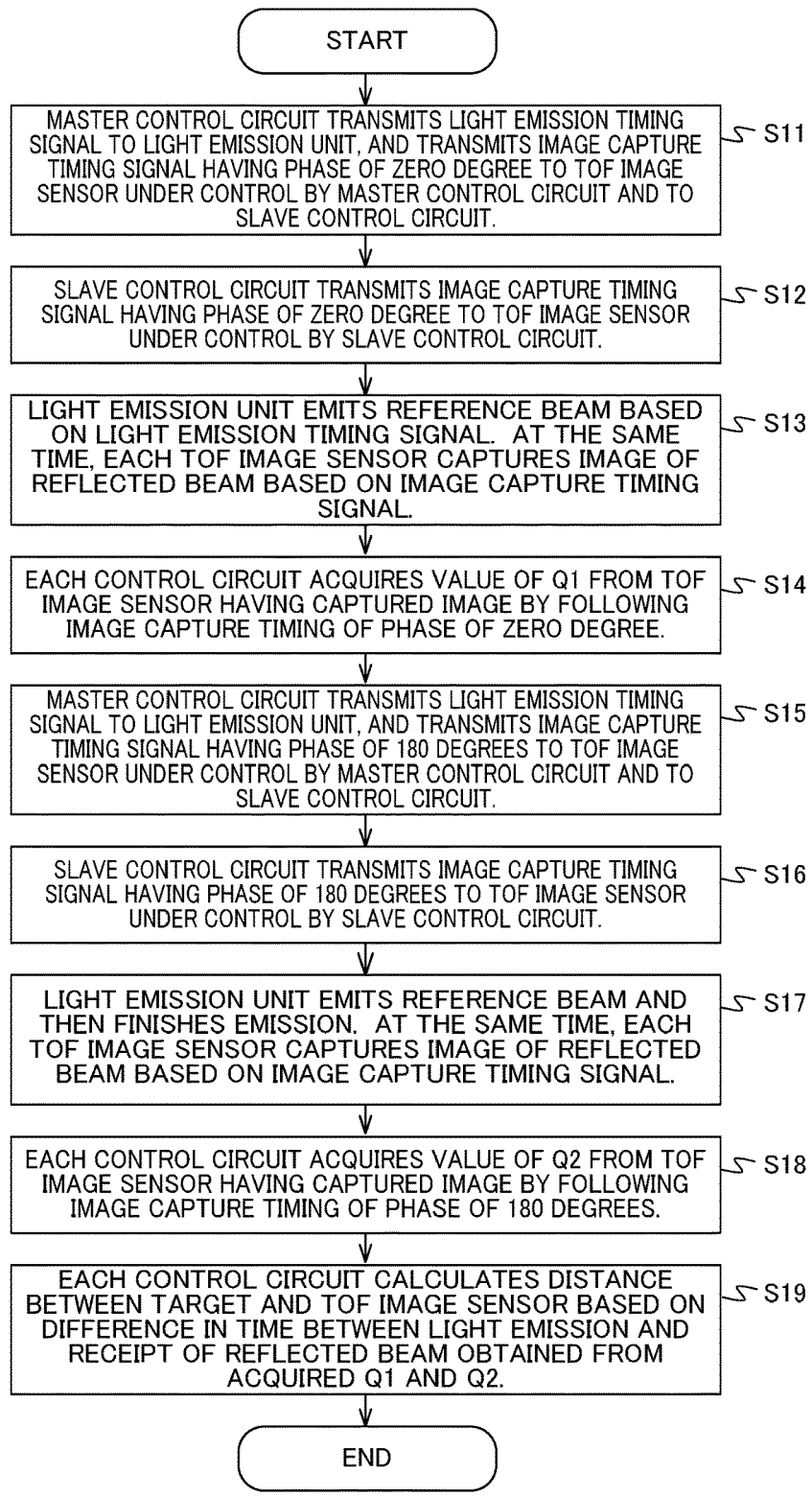
FIG. 2 is a flowchart showing processing executed by the image capture device according to the first embodiment of the present invention.

According to the first embodiment, in step S13 of the flowchart of FIG. 2, emission of a reference beam and image capture of a reflected beam are ideally performed simultaneously. In step S17, finishing emission of a reference beam and image capture of a reflected beam are ideally performed simultaneously. However, as there has been shift in timing between signals resulting from variation in the lengths of interconnect lines used in the image capture device, variation in characteristics of components, an operating temperature, or aging degradation, for example, a slight difference in time has actually been caused between emission of a reference beam (or finish of the emission) and image capture of a reflected beam. According to the third embodiment, emission of a reference beam (or finish of the emission) and image capture of a reflected beam are ideally performed simultaneously by using the above-described phase shifters.

It is sufficient to provide only one of the phase shifters 174C and 174D. Further, delay is avoided by combining one of timing signals to pass through the phase shifters 174A, 174B, and 174C with a different one of these timing signals. Thus, any one of the phase shifters 174A, 174B, and 174C can be omitted.

Delay may be controlled before use of the device. Alternatively, delay may be controlled dynamically during use of the device.

[Effect Achieved by Third Embodiment]

The above-described configuration allows control over shift in timing between signals resulting from variation in the lengths of interconnect lines used in the image capture device, variation in characteristics of components, an operating temperature, or aging degradation, for example. As a result, emission of a reference beam (or finish of the emission) and image capture of a reflected beam can ideally be performed simultaneously.

Fourth Embodiment

Figure 8:
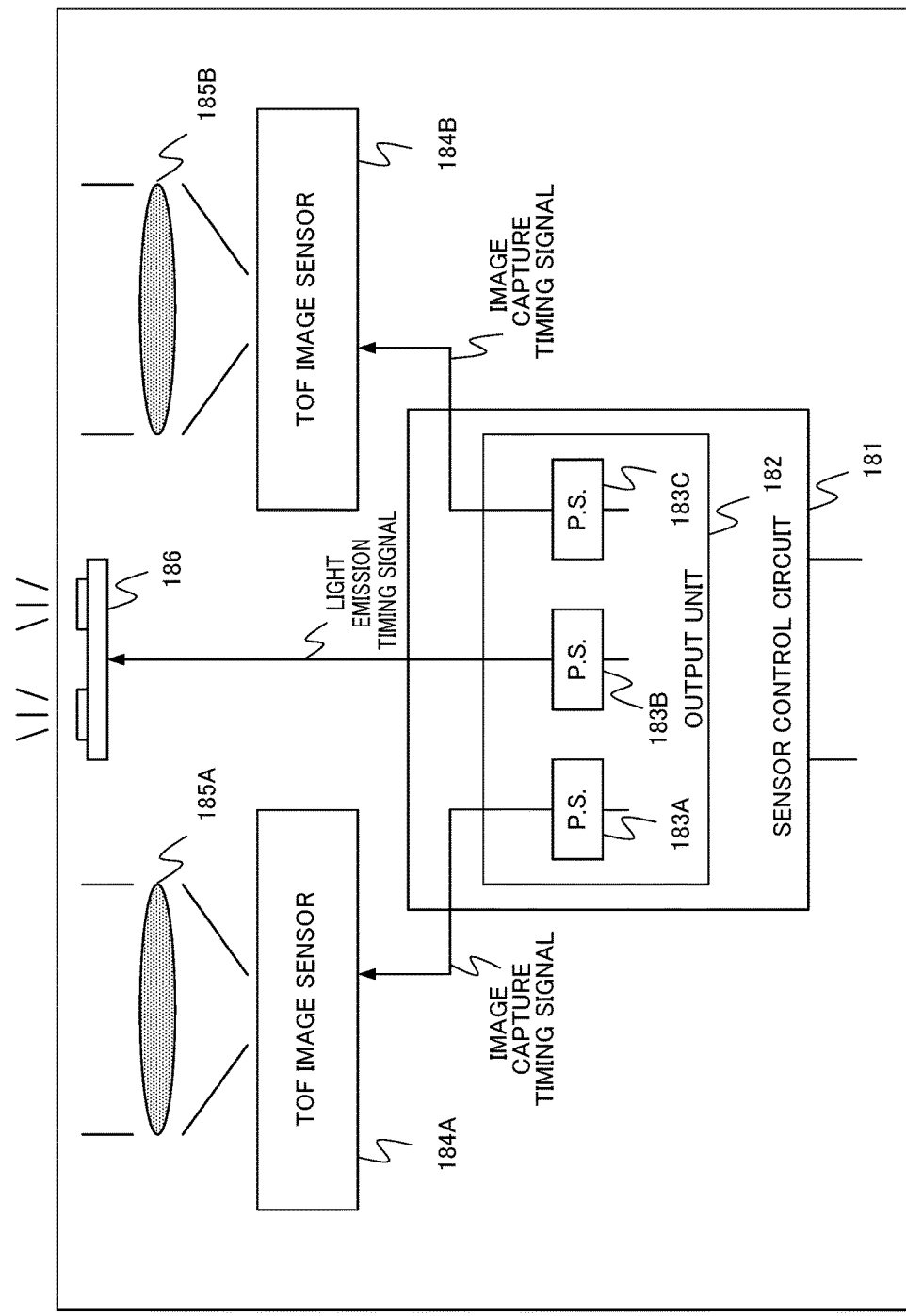
FIG. 8 shows the configuration of an image capture device according to a second modification of the present invention.
Figure 9:
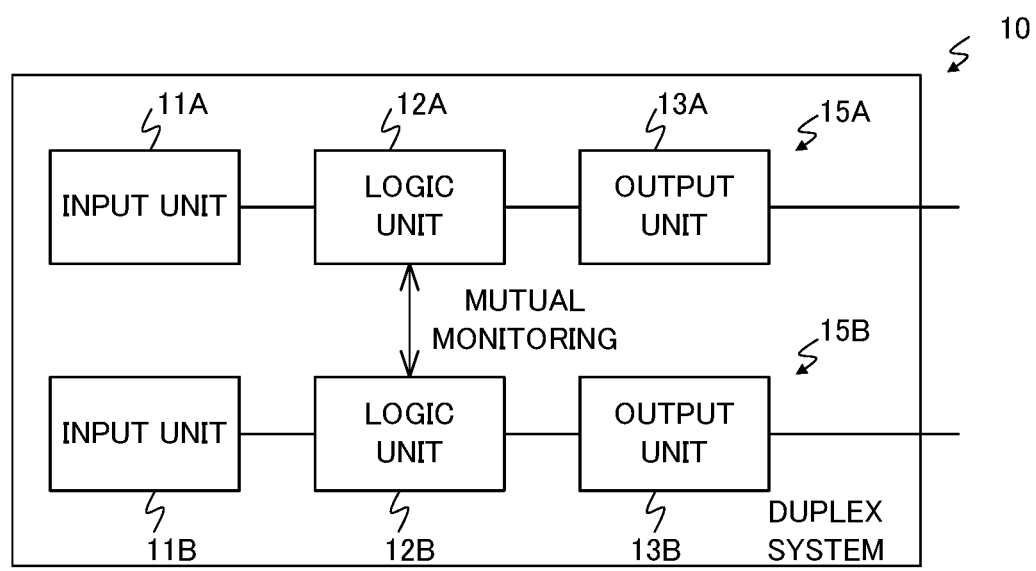
FIG. 9 shows an exemplary general configuration of a device having two systems each being capable of monitoring the other system.
Figure 10:
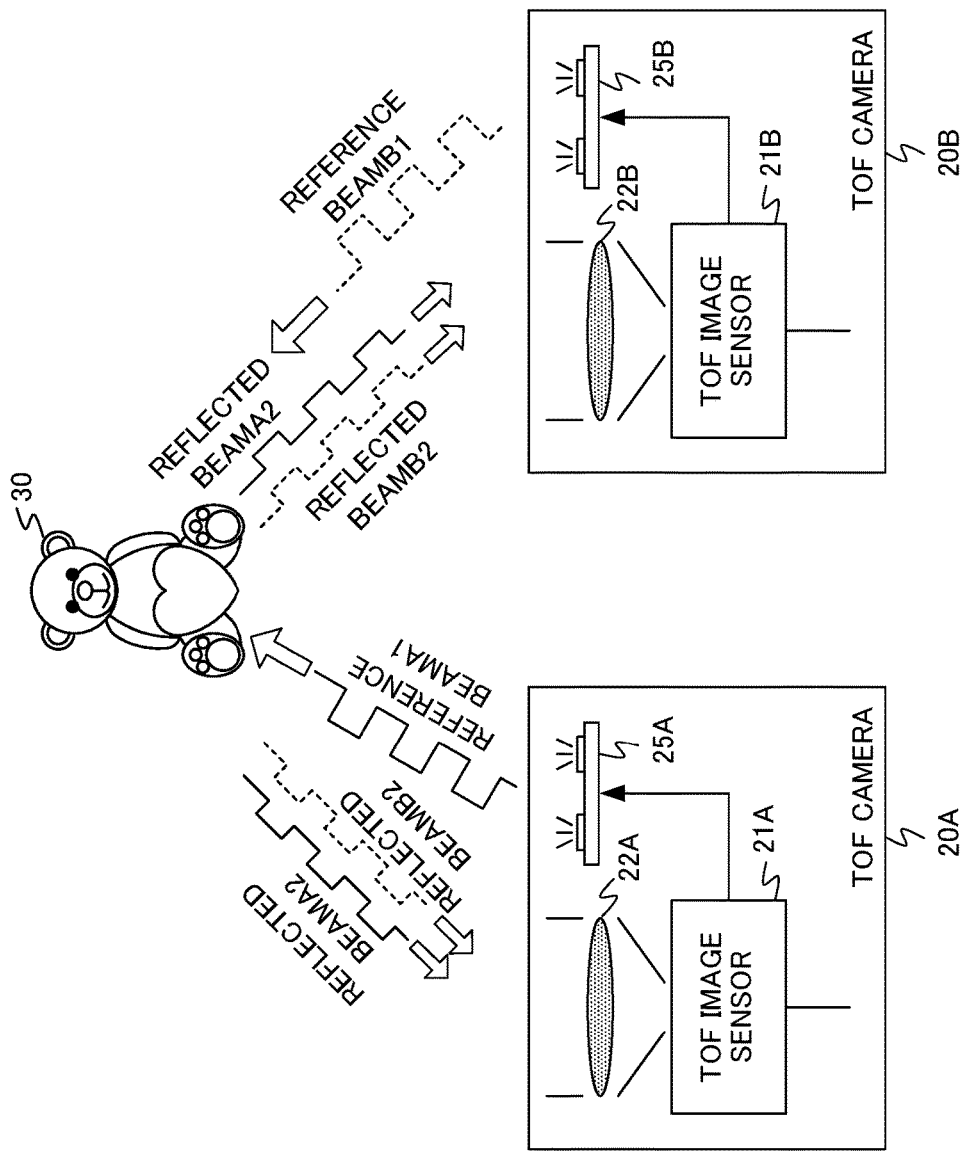
FIG. 10 shows influence caused by a reflected beam in the use of multiple conventional TOF cameras.
Figure 11:
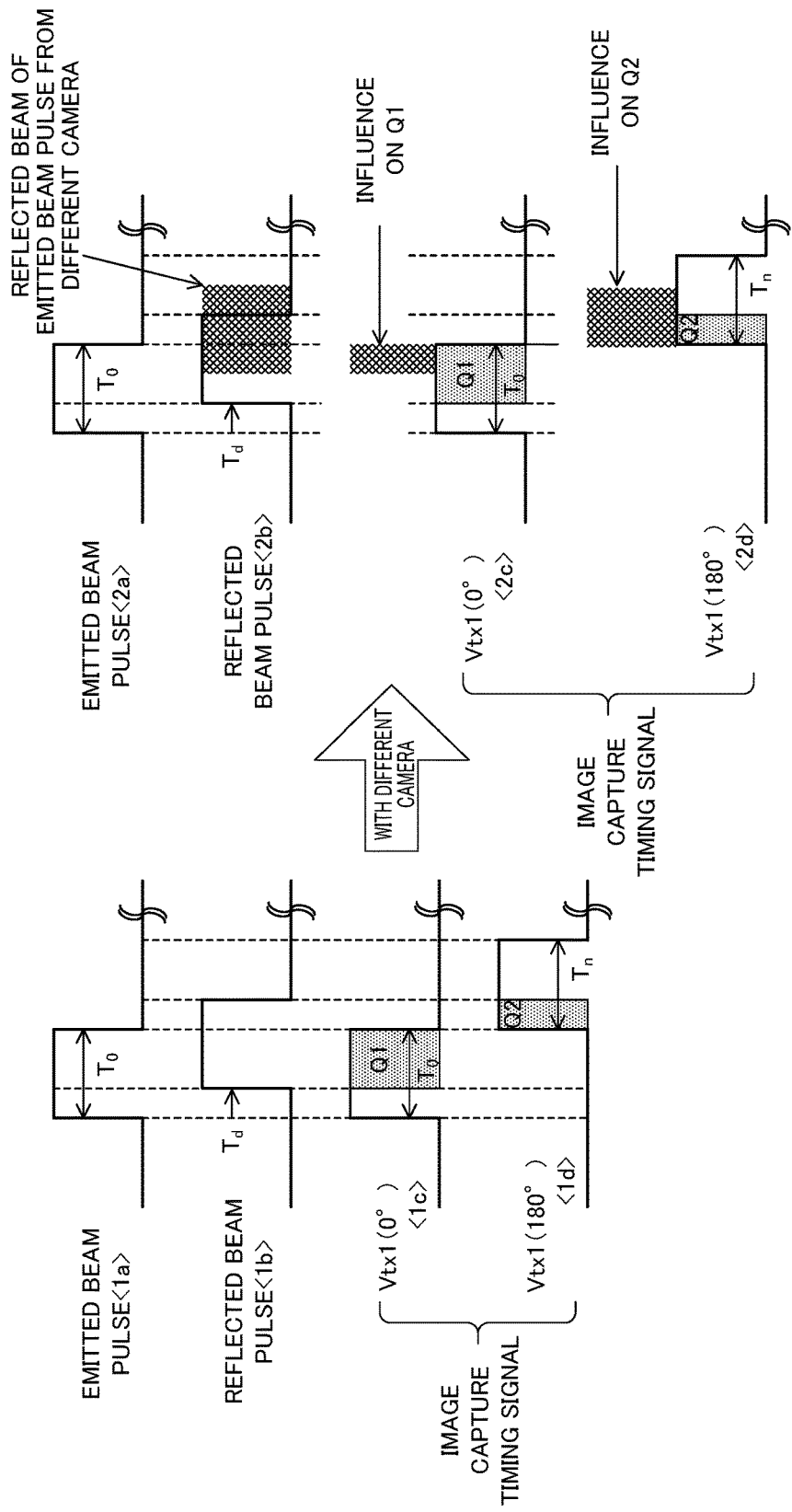
FIG. 11 shows the principles of distance measurement using a TOF camera and influence caused by a reflected beam resulting from a different TOF camera.
Figure 12:
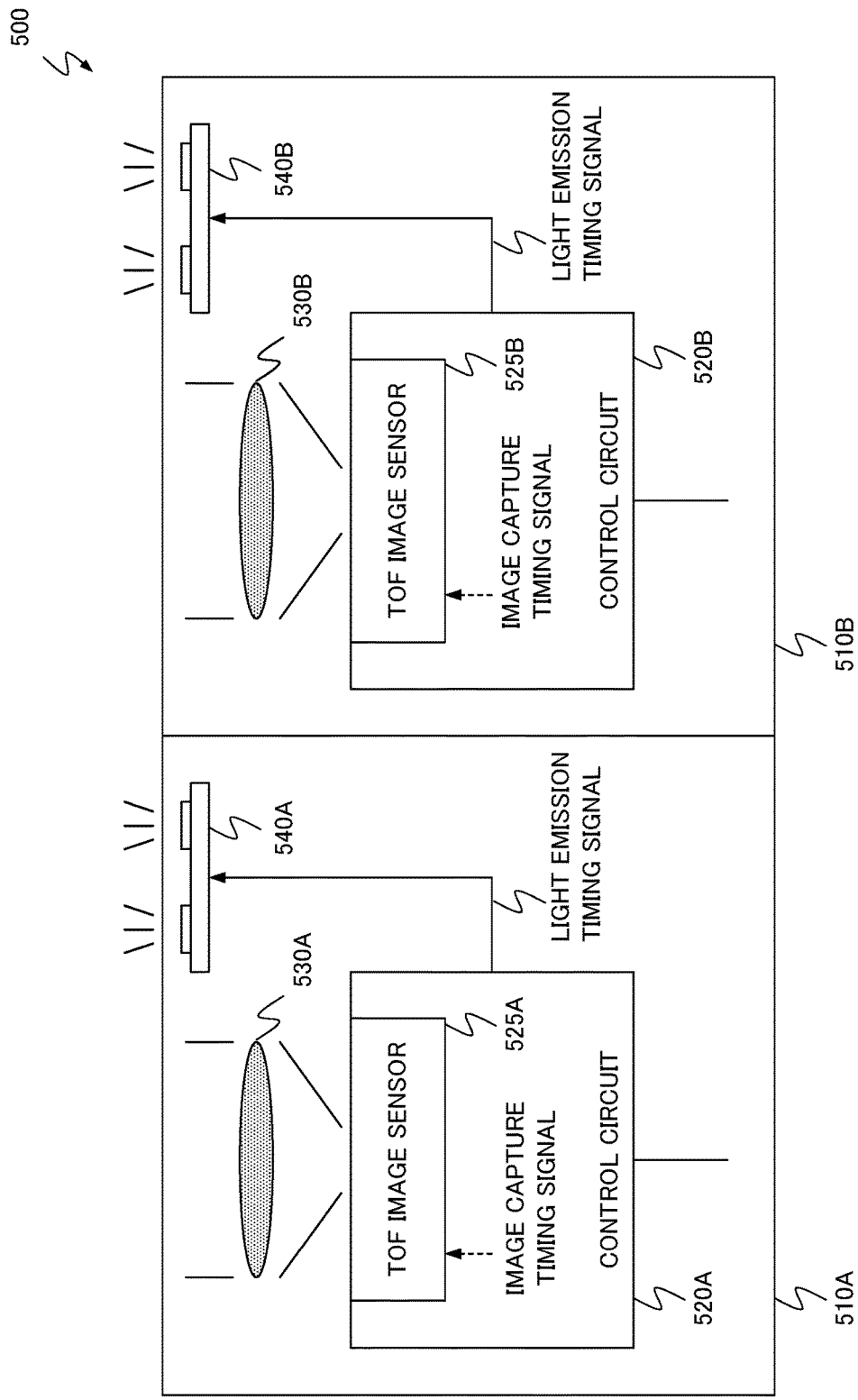
FIG. 12 shows an exemplary configuration of a conventional image capture device.
Figure 13:
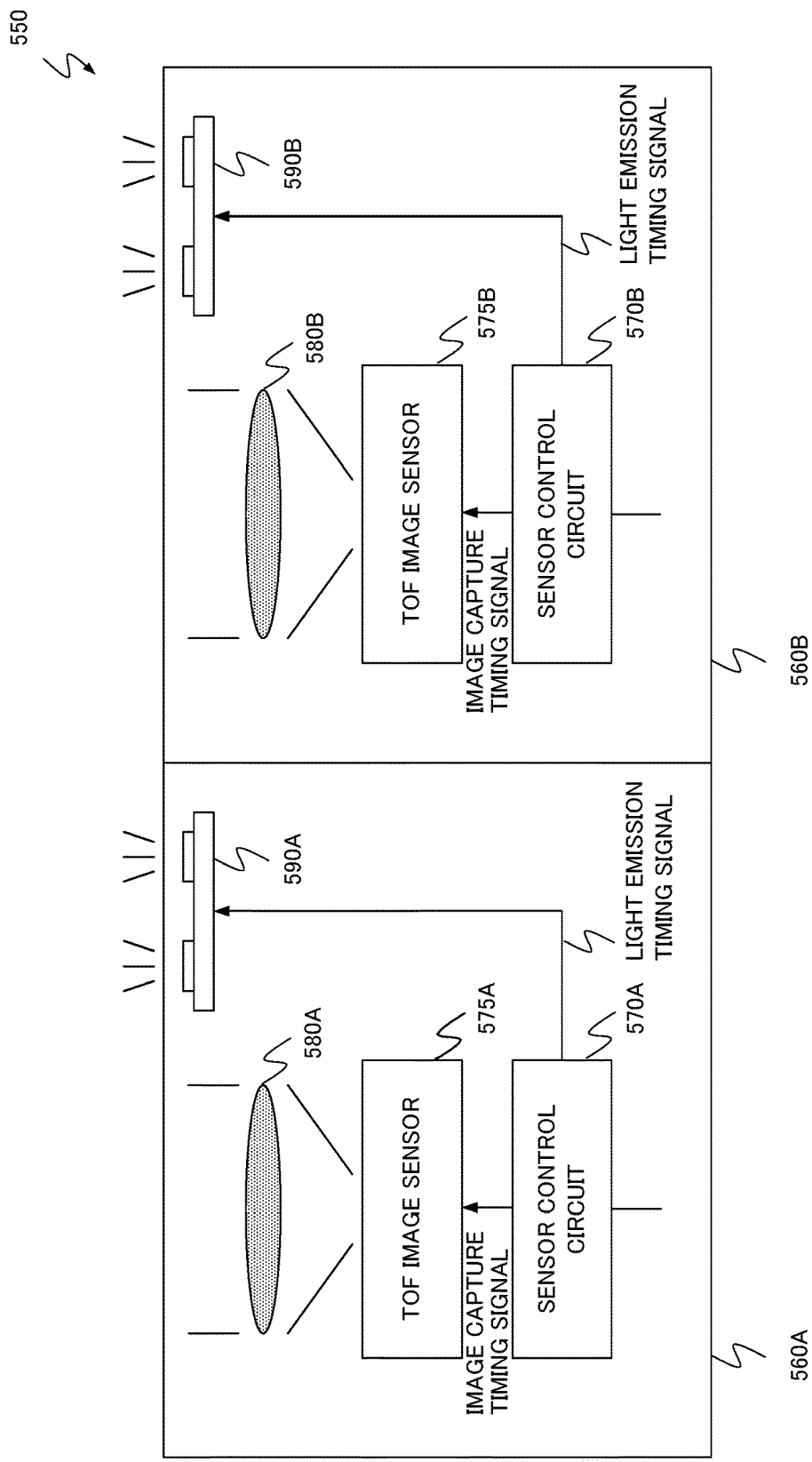
FIG. 13 shows an exemplary configuration of a conventional image capture device.
Figure 14:
FIG. 14 shows examples of light emission timing and image capture timing in the use of multiple TOF cameras.

FIG. 8 shows a fourth embodiment. Like the image capture device 150 of the second embodiment, an image capture device 180 according to the fourth embodiment includes a sensor control circuit 181, and a TOF image sensor 184A and a TOF image sensor 184B to be controlled by the sensor control circuit 181. (In the present specification, the "TOF image sensor 184A" may also be called an "image capture unit 184A." Likewise, the "TOF image sensor 184B" may also be called an "image capture unit 184B.") The image capture device 180 further includes a lens 185A corresponding to the TOF image sensor 184A, a lens 185B corresponding to the TOF image sensor 184B, and a light emission unit 186. These units have basic functions same as those of the corresponding units of the image capture device 150 according to the second embodiment, so that description of these functions will be omitted.

The sensor control circuit 181 includes an output unit 182 for output of a light emission timing signal and an image capture timing signal. Unlike in the image capture device 150 according to the second embodiment, the output unit 182 includes three phase shifters (PSs) 183A, 183B, and 183C. The phase shifter 183A is means to control delay of an image capture timing signal to be output from the output unit 182 of the sensor control circuit 181 to the TOF image sensor 184A by adjusting the phase of this image capture timing signal. The phase shifter 183B is means to control delay of a light emission timing signal to be output from the output unit 182 of the sensor control circuit 181 to the light emission unit 186 by adjusting the phase of this light emission timing signal. The phase shifter 183C is means to control delay of an image capture timing signal to be output from the output unit 182 of the sensor control circuit 181 to the TOF image sensor 184B by adjusting the phase of this image capture timing signal.

Figure 6:
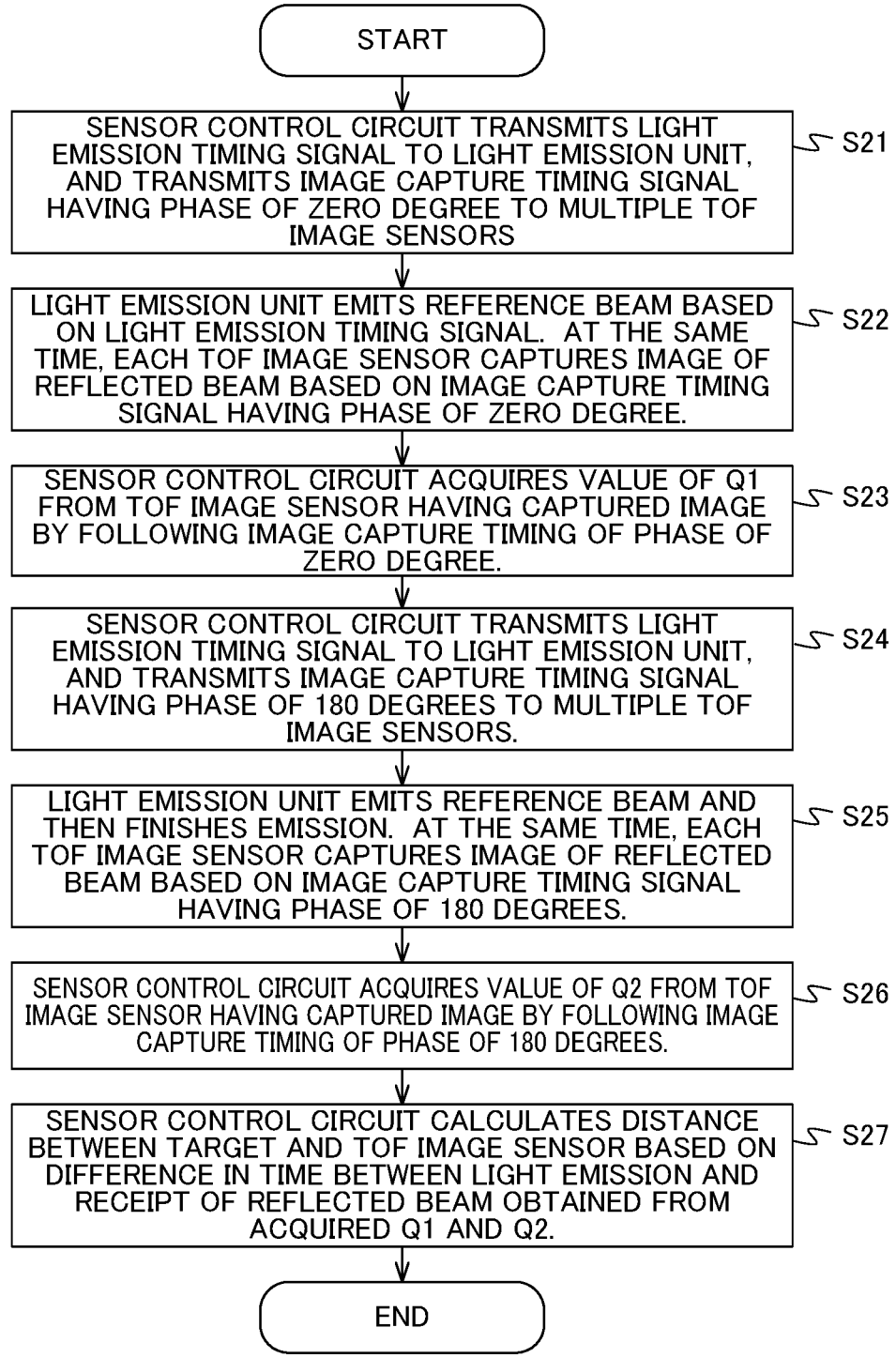
FIG. 6 is a flowchart showing processing executed by the image capture device according to the second embodiment of the present invention.

According to the second embodiment, in step S22 of the flowchart of FIG. 6, emission of a reference beam and image capture of a reflected beam are ideally performed simultaneously. In step S25, finishing emission of a reference beam and image capture of a reflected beam are ideally performed simultaneously. However, as there has been shift in timing between signals resulting from variation in the lengths of interconnect lines used in the image capture device, variation in characteristics of components, an operating temperature, or aging degradation, for example, a slight difference in time has actually been caused between emission of a reference beam (or finish of the emission) and image capture of a reflected beam. According to the fourth embodiment, emission of a reference beam (or finish of the emission) and image capture of a reflected beam are ideally performed simultaneously by using the above-described phase shifters.

Delay is avoided by combining one of timing signals to pass through the phase shifters 183A, 183B, and 183C with a different one of these timing signals. Thus, any one of the phase shifters 183A, 183B, and 183C can be omitted.

Delay may be controlled before use of the device. Alternatively, delay may be controlled dynamically during use of the device.

[Effect Achieved by Fourth Embodiment]

With the above-described configuration, the fourth embodiment can obtain effect comparable to that achieved by the third embodiment.

[Other Modifications]

The image capture device 100 according to the first embodiment illustrated in FIG. 1 includes two control circuits, two TOF image sensors, and two lenses. However, these are not the only numbers and any number of two or more is applicable as the numbers of these units.

Likewise, the image capture device 150 according to the second embodiment illustrated in FIG. 5 includes two TOF image sensors and two lenses. However, these are not the only numbers and any number of two or more is applicable as the numbers of these units.

According to the above-described first to fourth embodiments, multiple image capture units are arranged in the same housing. However, this is not the only arrangement of the image capture units. For example, the multiple image capture units can be configured as different units and an image capture timing signal may be transferred between these units through a line or a network.

The present invention is not to be limited to the embodiments of the present invention described above. The effects described in these embodiments are merely a list of the most preferable effects resulting from the present invention. The effects achieved by the present invention are not to be limited to those described in these embodiments.

An image capture method implemented by each of the image capture devices 100, 150, 170, and 180 is realized by software. To realize the image capture method by software, programs constituting this software are installed on a computer provided in each of the image capture devices 100, 150, 170, and 180. These programs may be stored in a removable medium and distributed to a user. Alternatively, these programs may be distributed to the user by being downloaded onto a computer of the user through a network. Still alternatively, these programs may be offered to the computer of a user as Web service through a network without being downloaded.

EXPLANATION OF REFERENCE NUMERALS 100, 150, 170, 180 Image capture device
101, 171 Control circuit (control unit)
103, 153, 175, 184 TOF image sensor (image capture unit)
107, 157, 177, 186 Light emission unit
151, 181 Sensor control circuit (sensor control unit)
174, 183 Phase shifter

What is claimed is:

1. An image capture device with multiple image capture units, the image capture device comprising:
one light emission unit for distance measurement that emits a reference beam; and
the multiple image capture units that capture images of a reflected beam of the reference beam while having common timing of image capture, wherein
the multiple image capture units include a first image capture unit as a master and a second image capture unit as a slave,
a control unit for the first image capture unit outputs a light emission timing signal to the light emission unit and outputs an image capture timing signal to a control unit for the second image capture unit,
the light emission unit emits a beam based on the light emission timing signal input from the control unit for the first image capture unit,
the second image capture unit captures an image based on the image capture timing signal input from the control unit for the first image capture unit, and
an output unit or an input unit that outputs or inputs the light emission timing signal and/or the image capture timing signal, and comprises a phase shifter which controls deviation in timing between the light emission timing signal and the image capture timing signal due to differences or changes in characteristics of components.

2. An image capture device with multiple image capture units, the image capture device comprising:
one light emission unit for distance measurement that emits a reference beam;
the multiple image capture units that capture images of a reflected beam of the reference beam while having common timing of image capture; and
a sensor control unit that outputs a light emission timing signal and an image capture timing signal, wherein
the light emission unit emits the reference beam based on the light emission timing signal input from the sensor control unit,
each of the multiple image capture units captures an image based on the image capture timing signal input from the sensor control unit, and
an output unit or an input unit that outputs or inputs the light emission timing signal and/or the image capture timing signal, and comprises a phase shifter which controls deviation in timing between the light emission timing signal and the image capture timing signal due to differences or changes in characteristics of components.

3. An image capture method implemented by an image capture device with multiple image capture units including one light emission unit for distance measurement that emits a reference beam and the multiple image capture units that capture images of a reflected beam of the reference beam while having common timing of image capture, the multiple image capture units including a first image capture unit as a master and a second image capture unit as a slave, the method comprising:
a control unit for the first image capture unit outputting a light emission timing signal to the light emission unit and outputs an image capture timing signal to a control unit for the second image capture unit,
the light emission unit emitting a beam based on the light emission timing signal input from the control unit for the first image capture unit,
the second image capture unit capturing an image based on the image capture timing signal input from the control unit for the first image capture unit, and
an output unit or an input unit that outputs or inputs the light emission timing signal and/or the image capture timing signal, and including a phase shifter for controlling deviation in timing between the light emission timing signal and the image capture timing signal due to differences or changes in characteristics of components.

* * * * *